United States Patent [19]

Evans et al.

[11] 4,134,013

[45] Jan. 9, 1979

[54] MASS SPECTROMETERS

[75] Inventors: Sydney Evans, Sale; Leonard J. Rutherford, Davyhulme, both of England

[73] Assignee: Scientific Apparatus Limited, England

[21] Appl. No.: 752,789

[22] Filed: Dec. 20, 1976

[30] Foreign Application Priority Data

Dec. 23, 1975 [GB] United Kingdom ............... 52574/75

[51] Int. Cl.² .............................................. B01D 59/44

[52] U.S. Cl. ..................................... 250/298; 250/281

[58] Field of Search ............... 250/298, 294, 295, 281, 250/282

[56] References Cited

U.S. PATENT DOCUMENTS

| | | | |
|---|---|---|---|
| 3,117,224 | 1/1964 | Francis et al. | 250/295 |
| 3,745,343 | 7/1973 | Halliday et al. | 250/294 |
| 3,814,936 | 6/1974 | Green | 250/298 |

*Primary Examiner*—Harold A. Dixon

*Attorney, Agent, or Firm*—Leydig, Voit, Osann, Mayer & Holt, Ltd.

[57] ABSTRACT

In the magnetic analyzer of a mass spectrometer in which a beam of ions travels from an entry slit to a collector slit, the field strength of the electromagnet can be increased by reducing the flux gap. In order however to avoid impingement of ions against the wall portions of the spectrometer tube in the reduced flux gap without reducing the width of the beam, collimating means are provided at opposite ends of the wall portions in the gap, the opposite walls of the collimating means extending from the tube wall portions up to the beam to intercept ions which otherwise would enter the collector slit directly or after reflection from the wall portions.

5 Claims, 5 Drawing Figures

MASS SPECTROMETERS

The present invention relates to a mass spectrometer.

A mass spectrometer comprises a specimen stage which includes apparatus for ionizing a specimen located in said stage and electrodes which are raised to a potential such as to attract ions from said specimen and to accelerate the ions towards an electrostatic analyser. The electrostatic analyser is a stage in which ions of the same energy are brought to the same focus point at the exit. Th electrostatic analyser is followed by a magnetic analyser which deflects particles of different masses by varying amounts and thereby focusses particles of the same mass to points at a known distance from the input of the magnetic analyser. A recording apparatus situated at this known distance records by electronic or photographic means the number of ions of a particular mass received during a known time period and hence a spectrum analysis of the specimen is obtained. The path through which the ions pass from the specimen to the recording apparatus is evacuated and the path through the magnetic analyser is a thin walled tube which is normally rectangular in cross section and arcuate in a plane perpendicular to the magnetic field which acts on the ions. The direction of the magnetic field which intersects the ion path will be referred to as the Z axis, whereas the direction of the radius of curvature of the tube will be referred to as the Y axis and the longitudinal direction of the tube will be referred to as the X axis.

If the accelerating voltage on the electrodes of the specimen stage is reduced then the ions will be travelling at a velocity which is slower in proportion to the square root of the change in electrode potential. At a lower velocity the magnetic analyser stage will have a correspondingly greater effect on ions of a certain mass and therefore with the largest possible magnetic flux obtainable ions of greater mass can be analysed. There is however a minimum electrode potential below which ions cannot be successfully extracted from the specimen and projected into the electrostatic analyser and magnetic analyser combination. Thus there is a maximum mass of ion which can be analysed by a given mass spectrometer.

It is possible to construct a magnetic analyser section of a mass spectrometer with a more powerful magnet which could therefore analyse heavier ions, but this would considerably increase the already considerable weight of the magnet and would also increase possible aberrations in the magnetic field. A further method of increasing the mass range of the spectrometer is to increase the field strength by decreasing the gap (i.e., on the Z axis) between the poles of the magnet but this has the disadvantage of decreasing the available gap width through which the ion beam must pass and therefore increasing the risk of an ion striking the wall of the tube of the magnetic analyser. If the ion should strike the wall of the tube it could reflected from the wall, or the collision with the wall could possibly cause other ions to be scattered into the main path of the ion beam. This will result in an increase in the ion beam width and a consequent loss of resolution of the instrument. In addition, there is possible fragmentation of ions by the impact of collisions with the wall of the tube, producing a distortion of the mass spectrum.

A mass spectrometer is provided with a source slit, a collector slit, and normally also a moniter slit, and if the magnet gap were reduced it would normally be necessary to reduce the lengths (on the Z axis) of the source slit and of the moniter slit in order to prevent ions striking the walls of the tube which would markedly reduce the sensitivity of the instrument.

According to the present invention there is provided a mass spectrometer including a magnetic analyser, the magnetic analyser comprising means defining a collector slit, a tube for containing an ion beam travelling toward the collector slit, an electromagnet, the tube having two opposite wall portions mounted between pole pieces of the electromagnet and substantially perpendicular to the direction of the flux path between the pole pieces, means defining the beam and collimating means located adjacent opposite ends of the said wall portions and extending from the walls of the tube up to the two spaced surfaces defined by the opposite edges of the collector slit and two corresponding edges of the beam-defining means.

The present invention also provides a mass spectrometer including a magnetic analyser, the magnetic analyser comprising means defining a collector slit, a tube for containing an ion beam travelling toward the collector slit, an electromagnet, the tube having two opposite wall portions mounted between pole pieces of the electromagnet and substantially perpendicular to the direction of the flux path between the pole pieces, means defining the beam and collimating means located adjacent the wall portions and cooperating with said means defining the collector slit to intercept all ions other than those travelling directly from said means defining the beam to the collector slit.

The present invention further provides a mass spectrometer including a magnetic analyser, the magnetic analyser comprising means defining a collector slit, a tube for containing an ion beam travelling toward the collector slit, an electromagnet, the tube having two opposite wall portions mounted between pole pieces of the electromagnet and substantially perpendicular to the direction of the flux path between the pole pieces, means defining the beam and collimating means located adjacent the wall portions to screen the collector slit from substantially all those ions which would otherwise enter the collector slit as a result of reflection from the walls of the tube.

Again the present invention provides a mass spectrometer including a specimen stage, an electrostatic analyser stage and a magnetic analyser stage in which the magnetic analyser stage includes an arcuate tube mounted between the pole pieces of an electromagnet, means defining an entry slit, a monitor slit or other second slit and a collector slit, the second slit being of a greater depth in a direction parallel to the axis of curvature of the tube than that which would wholly prevent ions passing through the entry slit from impinging on opposite wall portions of the tube, and including means defining fourth and fifth slits spaced apart adjacent opposite ends of said wall portions and effective to intercept ions travelling towards said wall portions along straight lines extending through the entry slit and second slit.

Embodiments of the present invention will now be described, by way of example, with reference to the accompanying drawings, in which.

Figure 1:
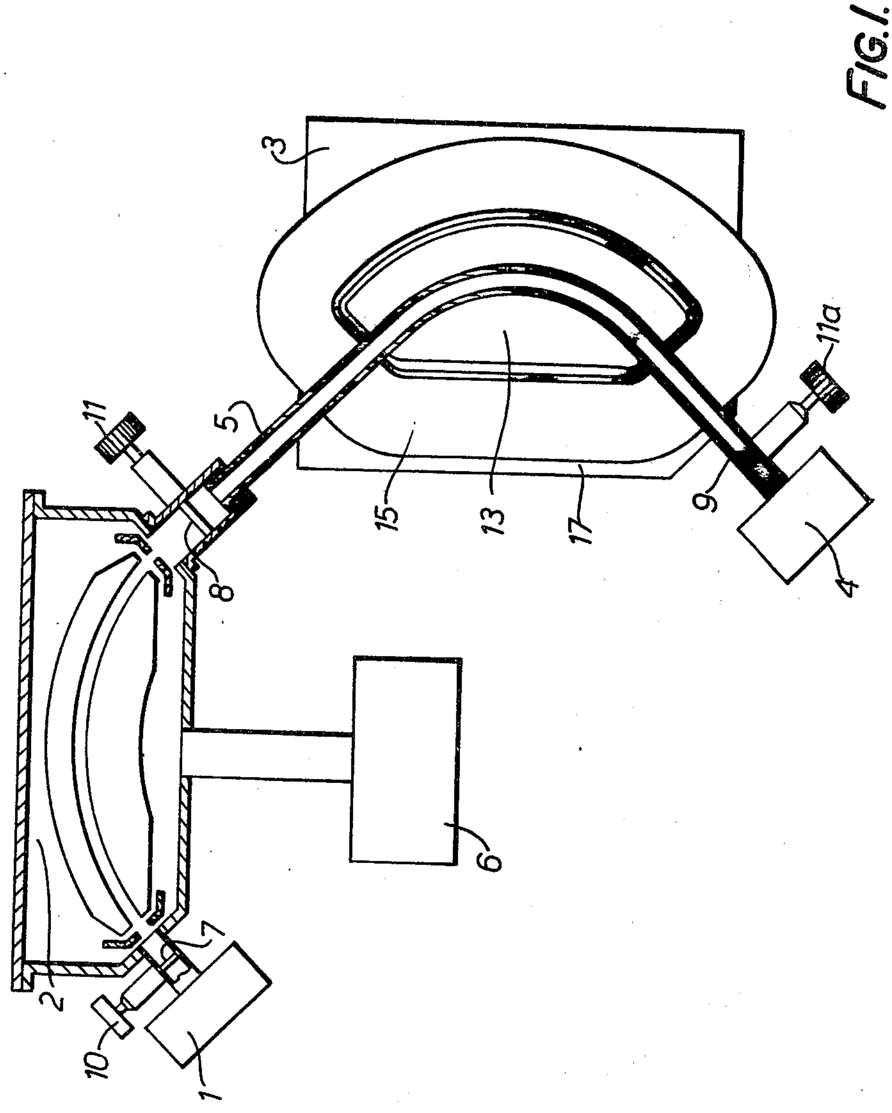
FIG. 1 shows in partial cross section a known mass spectrometer and illustrates only the major features.

Referring now to FIG. 1 there is shown a known mass spectrometer including a specimen stage 1, an electrostatic analyser stage 2, a magnetic analyser stage 3 and a detector or collector stage 4. The specimen stage includes means (not shown) for introducing and ionising the specimen and electrodes (not shown) which are raised to a sufficient potential with respect to the specimen to attract ions therefrom and to propel the ions along an ion beam path towards the electrostatic analyser stage.

The ion beam passes through the electrostatic analyser stage, ions of different electrical energy being focussed to different points at the output. The ion beam passes into the magnetic analyser stage and travels within tube 5 to the detector stage 4. Within the magnet analyser stage ions of the same mass are focussed towards the same point at the detector.

The spaces within the specimen stage, the electrostatic analyser and the magnetic analyser stage are evacuated by a vacuum pump 6 shown diagrammatically. The vacuum along the ion beam path is required to be very high.

The ion beam passes through three slits 7, 8 and 9 the widths (in the Y direction) of which may be adjustable, slit 7 being the entry slit of the magnetic analyser stage, slit 8 being the monitor slit and slit 9 being the collector slit. The means of adjustment of slits 7, 8 and 9 are shown as respective mechanical adjustment means 10, 11 and 11*a*.

Figure 2:
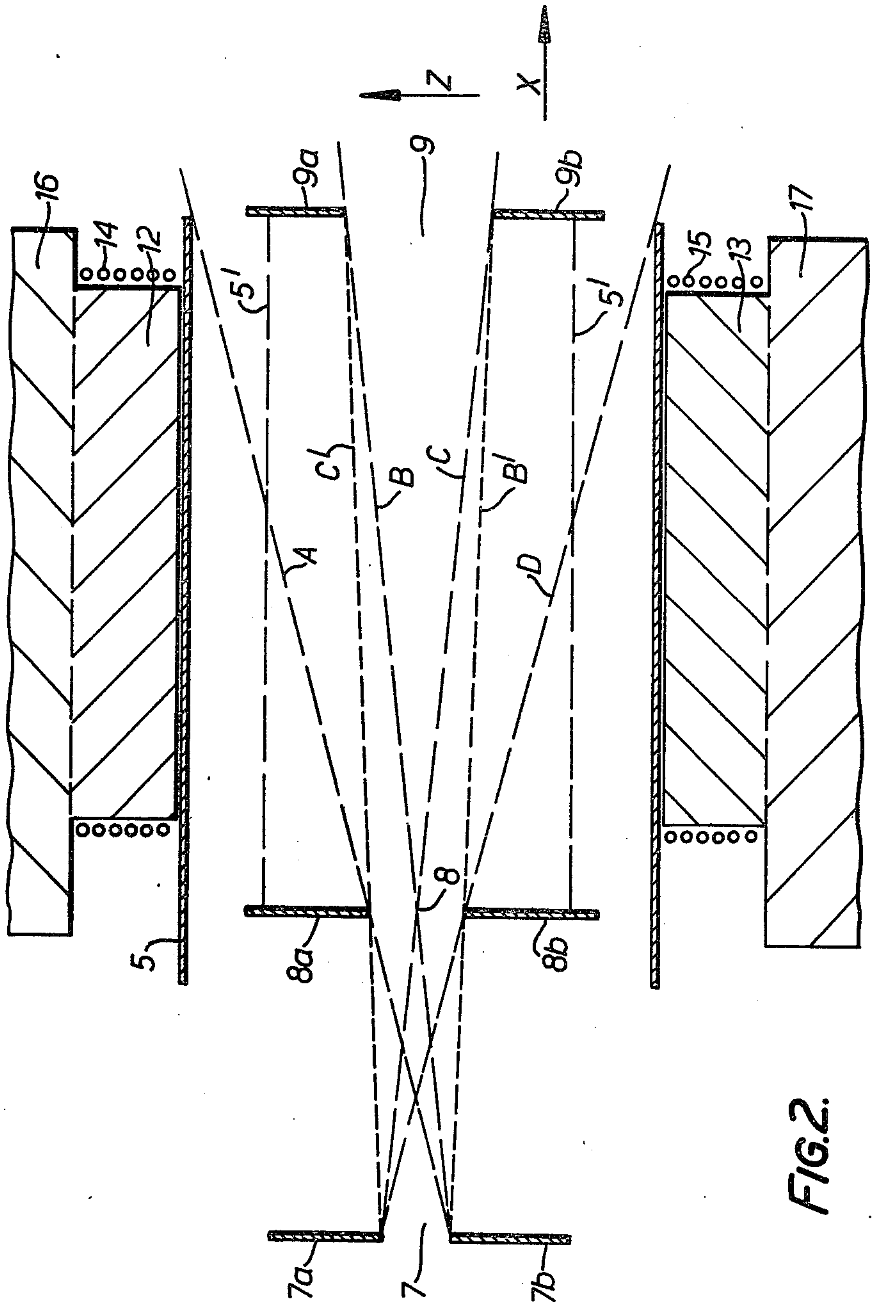
FIG. 2 shows a known arrangement of the tube passing through the magnetic analyser stage of the mass spectrometer of FIG. 1.
Figures 4, 5:
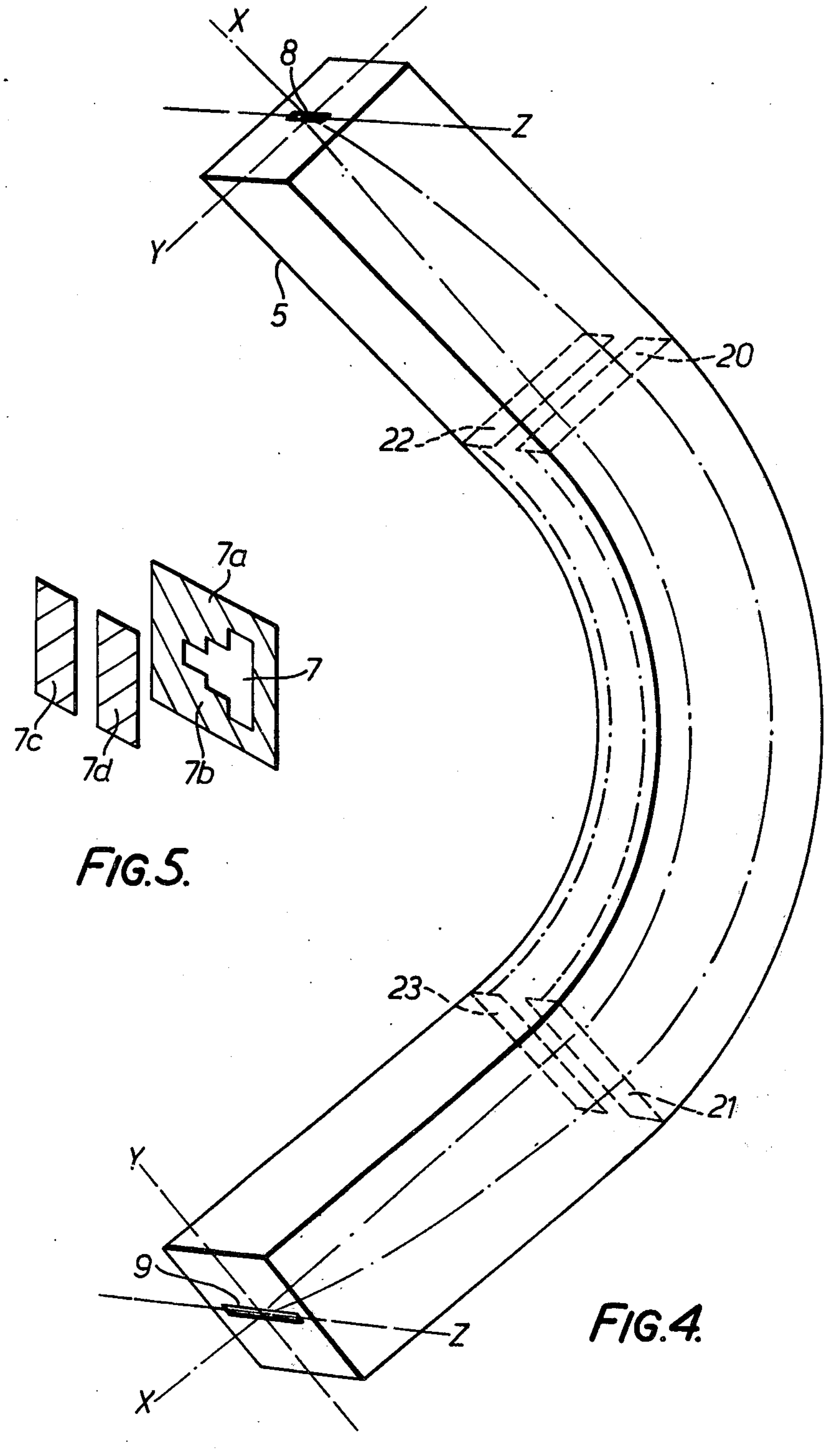
FIG. 4 shows a perspective view of a tube arrangement for the mass spectrometer of FIG. 1 in partial cross section.
FIG. 5 shows a slit length adjustment mechanism.

Referring now to the known construction of FIG. 2, the means defining the length (in the Z direction) of slits 7, 8 and 9 are shown as plates 7*a*, 7*b*; 8*a*, 8*b* and 9*a*, 9*b*, the plates 8*a*, 8*b* being located upstream and the plates 9*a*, 9*b* being located downstream of pole pieces 12, 13. As shown in FIG. 5, in practice the plates 7*a*, 7*b* of FIG. 2 form the upper and lower portions of a single apertured plate in which the upper and lower edges of the aperture are stepped, and two plates 7*c*, 7*d* extending in the Z direction are superimposed on plates 7*a*, 7*b* to define the slit 7. By moving the plates 7*c*, 7*d* toward or away from each other, the width (in the Y direction) of the slit is varied, and by moving the plates 7*a*, 7*b* relative to plates 7*c*, 7*d* to superimpose a differently stepped portion of plates 7*a*, 7*b* on the gap between plates 7*c*, 7*d*, the length (in the Z direction) of the slot is varied. The other slits are formed and varied in a similar way. It will nevertheless be convenient to continue to refer to plates 7*a*, 7*b*, plates 8*a*, 8*b* and plates 9*a*, 9*b*.

The tube 5 is shown in cross section along a line parallel to the ion beam path and in a plane perpendicular to the plane of FIG. 1. Thus FIG. 2 illustrates in a single plane the ion beam paths from the specimen stage or entry slit 7 to the detector stage or collector slit 9.

The ion beam has two basic outer limits as illustrated by rays A, B, C and D. Ray D shows the outermost limit at which an ion which just passes the plates 7*a* and 8*b* will pass down the tube 5. Similarly ray A shows the outermost limit at which an ion which just passes both plates 7*b* and 8*a* will pass down the tube 5. Thus the rays A and D define the limits in the Z direction of the total ion beam.

Similarly rays B, $B^1$ and C, $C^1$ show the limits in the Z direction of the ion beam which will pass through the detector or collector slit 9, where rays $B^1$ and $C^1$ define the overall limits of the beam. Thus rays intermediate between B and $B^1$ and between C and $C^1$ will all pass through the detector or collector slit 9.

FIG. 2 shows that neither ray A nor ray D can strike the side walls of the tube 5 (adjacent to the magnet poles 12, 13) in front of slits 9, the lengths of slits 7 and 8 (in the Z direction) being normally proportioned to ensure this. Any ray taking an intermediate path between rays A and B or between rays C and D will hit either the plates 9*a* or 9*b* or the end wall of the tube 5 (not shown). In either case the ray will not hit any surface at a low angle of incidence and therefore any reflected or scattered ions will not be able to reach the collector slit. This is very important since any internal reflections from the wall of the tube can result in collisions along the ion beam path and by scattering of the ions an incorrect spectrum will result at the detector stage.

If, however, in order to increase the magnetic flux across the tube, the tube of FIG. 2 were made narrower for example as indicated by chain-dotted lines 5′ there is a considerable risk that ions will strike the walls 5′ of the tube and be reflected so as to pass through the detector slit 9. Shortening of slit 8 to avoid this will seriously reduce the sensitivity of the apparatus.

Figure 3:
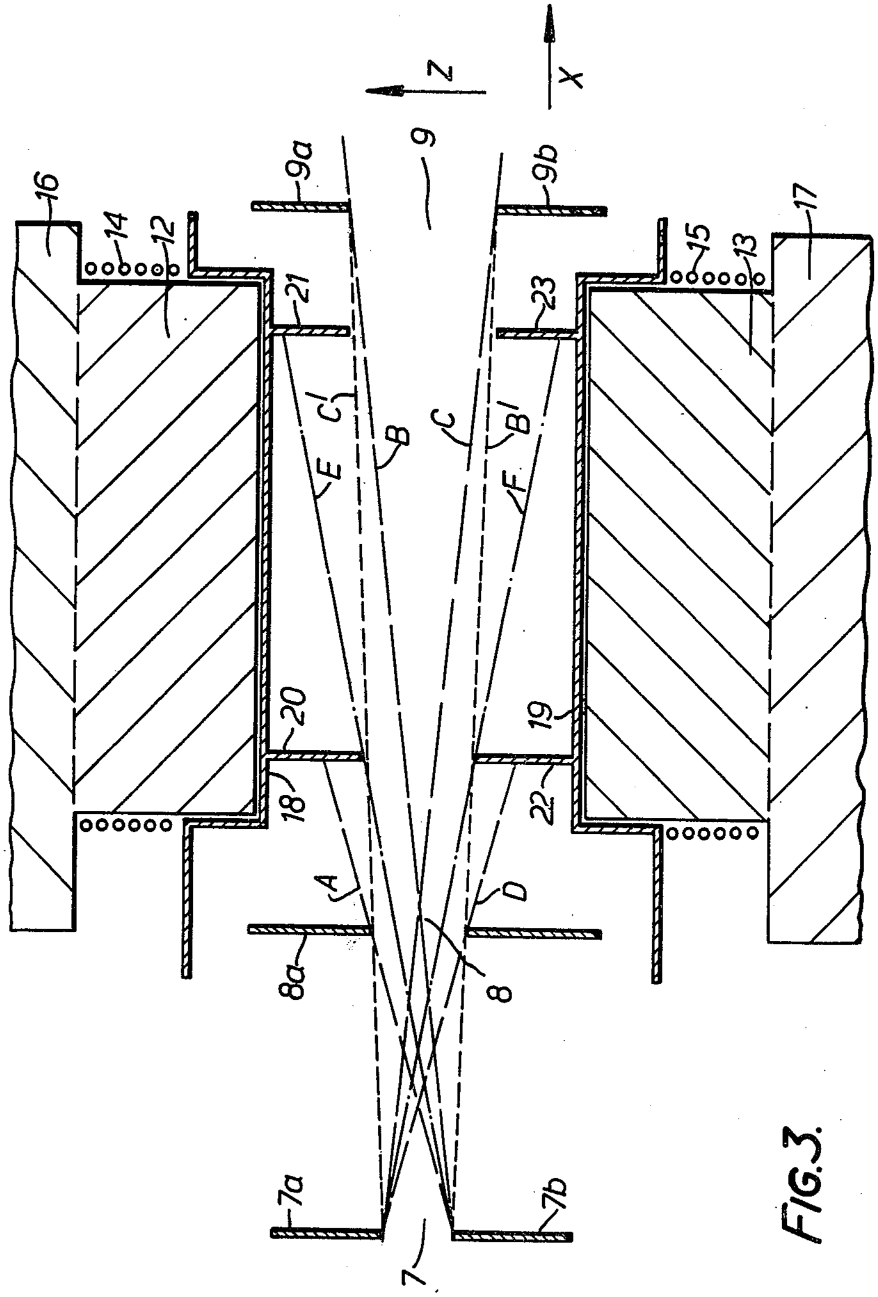
FIG. 3 shows the tube arrangement for the mass spectrometer of FIG. 1, according to the present invention.

FIG. 3 shows an arrangement allowing reduction of the tube at the pole pieces 12, 13 of the electromagnet shown diagrammatically by the respective conductor turns 14, 15 and yokes 16, 17. The tube 5 is cut away on each side over a section slightly longer than the length of the pole pieces and a section of restricted breadth, to suit the reduced magnet gap, is inserted by brazing plates 18, 19 into position as shown. Further plates 20, 21, and 22, 23 are brazed respectively on to plates 18, 19 and substantially at right angles thereto such that they project inwardly into the tube 5 to form two beam restricting means i.e., collimating means. The plates 20, 22 prevent the ion beams A and D from striking the respective plates 18, 19. Rays A and D strike the plates 20, 22 at a relatively high angle of incidence and are scattered in such a way that they cannot pass through the collector slit.

Further rays E and F are shown which just clear the inner edge of plates 20, 22 respectively. These rays are also not allowed by the geometry of the structure to strike the respective plates 18, 19 but strike instead the respective further plates 21, 23 which screen the collision from the collector slit.

The plates 20, 21 extend inwardly of the tube up to the plane defined by the slit-forming edges of plates 7*a*, 8*a* and 9*a*, whereas plates 22, 23 extend inwardly of the tube up to the plane defined by the slit-forming edges of plates 7*b*, 8*b* and 9*b*, that is, such that they touch but do not interfere with the boundary ray paths $B^1$ and $C^1$. Typical dimensions, in the Z direction, of the slits formed between plates 7*a*, 7*b*, plates 20, 22, plates 21, 23 and plates 9*a*, 9*b* are 0.10; 0.16; 0.18 and 0.20 inches respectively.

It is clear that provision of plates 20, 21, 22 and 23 permits the use of slits 7 and 8 which are longer (in the Z direction) than would be the case if the length of these latter slits had to be restricted in order to prevent ions from striking the walls of the analyser tube which are adjacent to the magnet poles. By the use of plates 20, 21, 22 and 23 the sensitivity of the instrument is therefore increased as compared with that which would be achievable in the absence of such plates, for a given magnet gap and hence a given breadth of tube.

The plates 20, 21, 22, 23 are constructed from non-magnetic material, possibly the same material as the tube 5 and are preferably as thin as possible consistent with normal machining and brazing problems. The plates 20, 21, 22, 23 which may be shaped such that the top or innermost edge slopes away from the oncoming ion beam, can be positioned as shown in FIG. 3 but alternatively can be positioned at a greater or lesser distance apart along the tube depending on the geometry of the tube.

FIG. 4 shows a three dimensional view of the magnetic analyser tube between the slit 8 and the slit 9. The plates 20, 22, and 21, 23 are shown in chain-dotted lines. The path of the ion beam focussed in the Y plane is shown in dashed lines.

In a practical embodiment the internal depth (in the Z direction) of tube 5 was reduced from 0.415 inches to 0.310 inches at the pole pieces whilst maintaining the length of the slits 7, 8 and 9 (in the Z direction) at 0.100, 0.100 and 0.200 inches respectively. The length of tube 5 was approximately 36 inches with a mean pole piece radius of 12 inches and the distance from slit 7 to 8 was approximately 24 inches. It will therefore be realised that FIGS. 3 and 4 are drawn to considerably different scales in the X and Y directions of the ion beam.

In an alternative configuration of the mass spectrometer the magnetic stage may preclude the electrostatic stage.

We claim:

1. A mass spectrometer including
a magnetic analyser, the magnetic analyser comprising
means defining a collector slit,
a tube for containing an ion beam travelling toward the collector slit,
an electromagnet having pole pieces,
two opposite wall portions of the tube mounted between the pole pieces of the electromagnet with the planes in which the wall portions lie extending substantially perpendicular to the direction of the flux path between the pole pieces,
means defining the beam and
collimating means spaced apart longitudinally of the beam and located adjacent opposite ends of the said wall portions and extending from the wall portions of the tube up to two spaced imaginary surfaces lying transverse to the direction of said flux path and defined by the two opposite edges of the collector slit and two corresponding edges of the beam-defining means.

2. A mass spectrometer including
a magnetic analyser, the magnetic analyser comprising
means defining a collector slit,
a tube for containing an ion beam travelling toward the collector slit,
an electromagnet having pole pieces,
two opposite wall portions of the tube mounted beween the pole pieces of the electromagnet with the planes in which the wall portions lie extending substantially perpendicular to the direction of the flux path between the pole pieces,
means defining the beam and
collimating means spaced apart longitudinally of the beam and located adjacent the wall portions, said collimating means extending towards the beam in a direction parallel to the direction of said flux path and cooperating with said means defining the collector slit to intercept all ions other than those travelling directly from said means defining the beam to the collector slit.

3. A mass spectrometer including
a magnetic analyser, the magnetic analyser comprising
means defining a collector slit,
a tube for containing an ion beam travelling toward the collector slit,
an electromagnet having pole pieces,
two opposite wall portions of the tube mounted between the pole pieces of the electromagnet extending substantially perpendicular to the direction of the flux path between the pole pieces,
means defining the beam and
collimating means located adjacent the wall portions and extending toward the beam in a direction parallel to the direction of said flux path and screening the collector slit from substantially all those ions which would otherwise enter the collector slit as a result of reflection from the walls of the tube.

4. A mass spectrometer including
a specimen stage,
an electrostatic analyser stage and
a magnetic analyser stage in which the magnetic analyser stage includes
an electromagnet having pole pieces,
an arcuate tube mounted between said pole pieces and having wall portions extending transversely to the direction of the flux path between said pole pieces,
means defining an entry slit,
means defining a second slit and
means defining a collector slit,
the second slit restricting the depth (measured in the direction of the flux path) of a beam of ions passing through the magnetic analyser stage but insufficiently to wholly prevent ions passing through the entry slit from impinging on opposite wall portions of the tube, and including
means defining fourth and fifth slits spaced apart adjacent opposite ends of said wall portions and so restricting the depth of the beam as to intercept ions travelling towards said wall portions along straight lines extending through the entry slit and second slit.

5. A mass spectrometer according to claim 4 wherein the wall portions between the means defining the fourth and fifth slits and extending transversely to the direction of the flux path are inwardly stepped towards the ion beam with respect to adjacent wall portions of the tube.

* * * * *